2,925,687

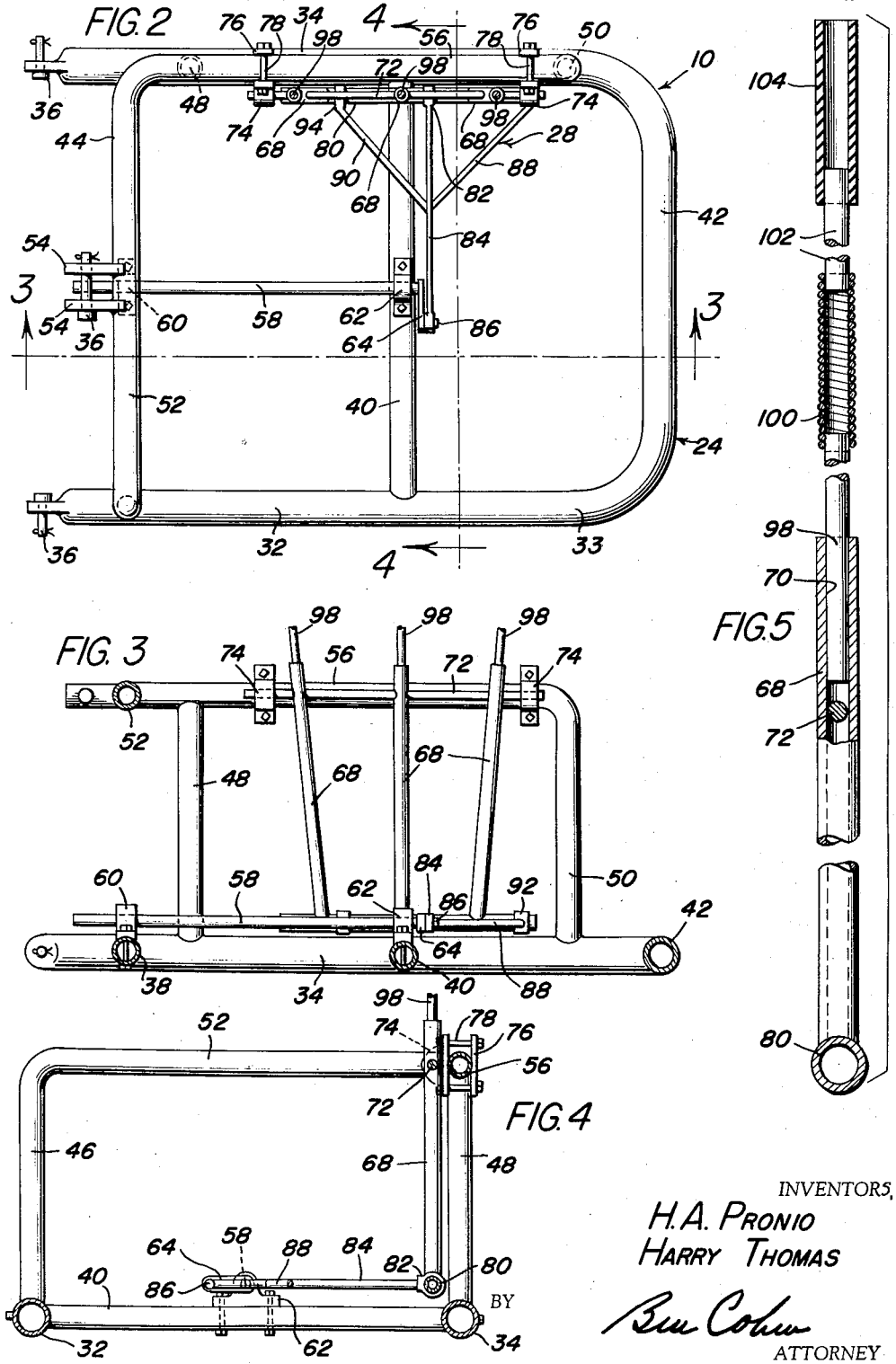

FRUIT THINNER

Harry A. Pronio, Zanesville, and Harry Thomas, Coshocton, Ohio

Application April 1, 1958, Serial No. 725,711

7 Claims. (Cl. 47—1)

This invention relates generally to harvesting apparatus and more particularly to a power operated fruit thinner.

When raising fruit in an orchard operation it has been found that if too many of the fruit grow in a cluster the fruit will not mature as desired, resulting in some or all of the fruit of the cluster being runted or under-developed and thus being unpalatable and unsalable. A common expedient to overcome excessive fruit in the cluster is to remove or thin out some of the fruit of the cluster, and thus provide more nourishment to the fruit that remains whereby such remaining fruit is forced and is of better quality and more marketable.

Power operated tree shaking apparatus has been proposed in the past for thinning out fruit but this expedient has not proved to be accurate or efficient. Thinning tools held in the worker's hands for selectively striking particular fruit have also been proposed. However, the physical limitations of a worker becomes an important factor in such an operation and the use of such manually operated tools results in loss of time which is critical during certain periods of growing.

A primary object of this invention is to provide an effective and efficient power operated fruit thinner.

A further object of invention is to provide a power operated thinner which includes a tool portion vertically oscillated for striking fruit from a tree and which will cause a minimum of damage to the fruit remaining on the tree.

A still further object of this invention is to provide a power thinner including means whereby the apparatus may be mounted on a vehicle which includes means for operating the apparatus.

More particular objects of invention will become apparent from the reading of the following description of the preferred embodiment, the appended claims and the accompanying drawings in which:

Figure 2 is a top plan view of the fruit thinner of the invention;

Figure 3 is a section taken on line 3—3 of Figure 2;

Figure 4 is a section taken on line 4—4 of Figure 2; and

Figure 5 is an enlarged fragmentary section taken substantially on line 5—5 of Figure 1, showing in detail the construction of one of the whips with intermediate portions broken away.

Figure 1:
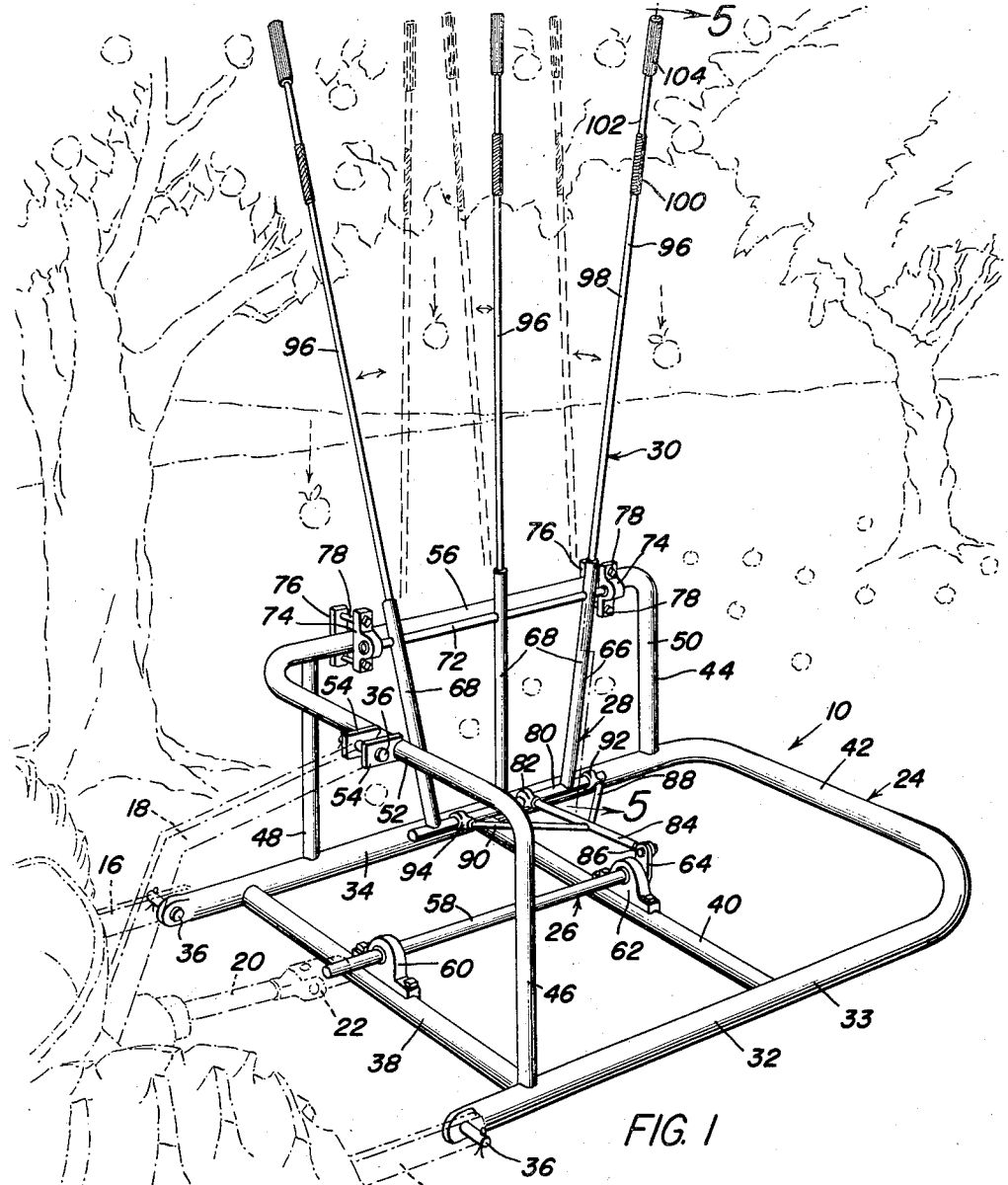
Figure 1 is a perspective view of the power operated thinner, mounted on a fragmentary rear end portion of a tractor which is shown in phontom lines, and showing by dotted lines an alternative position of portion of the thinner in relation to trees of the orchard.

Referring to the drawings in detail, as seen in Figure 1, a preferred embodiment of the power operated fruit thinner is indicated generally at 10 and is shown as being mounted and transported on a "three-hitch" tractor, a fragmentary rear end portion being indicated generally at 12.

The tractor conventionally includes lower lift arms 14 and 16, an upper power lift arm 18 and a rearwardly extending power take-off shaft 20 terminating in a portion of a universal joint 22.

The fruit thinner 10 includes a support frame indicated generally at 24, power means indicated generally at 26, oscillating-force transmitting means indicated generally at 28 and whip means indicated generally at 30.

The frame includes a generally horizontally disposed lower U-shaped portion 31 including parallel legs 32 and 34 pivotally connected at their forward end by means of transverse hinge pins 36 respectively cooperating with portions of the lift arms 14 and 16. Intermediate brace bars 38 and 40 extend between opposite portions of the legs, parallel to the back bar 42 of the U-shaped frame portion. Secured to the U-shaped frame portion is an overlying L-shaped frame portion 44 supported by means of depending legs 46, 48 and 50. The L-shaped frame portion 44 includes a transverse leg 52 having forwardly extending apertured parallel mounting plates 54 secured to the power lift arm 18 by means of a transverse hinge pin 36. The leg 52 continues in a side leg 56 parallel to leg 34.

The power means comprises a longitudinally disposed drive shaft 58 journaled in suitable aligned bearings 60 and 62 respectively mounted on the upper surface of the brace bars 38 and 40. The forward end of the drive shaft includes a cooperating portion of the universal joint 22, and the rear end of the shaft includes a laterally extending lever portion 64 which rotates with the drive shaft and comprises a portion of a "pitman-type" drive.

The oscillating-force transmitting means 28 comprises a vertically extending whip-holder member 66 including spaced tubular sleeve elements 68 which diverge slightly vertically and have an upwardly opening shaft-receiving socket portion 70, see Figure 5. The sleeve elements 68 have extending transversely therethrough an integral rock shaft 72, terminal ends of which being journaled in aligned bearings 74 which are retained in spaced relation on the leg 56 by means of clamp plates 76 and transverse nut-and-bolt assemblies 78. A transverse rod 80 is secured to the lower end of the sleeve elements 68 parallel to the rock shaft 72. Pivotally connected to the rod 80 by means of circumposed bearing 82 is one end of a force transmitting pitman rod 84. The rod 84 is pivotally connected by means of a transverse pivot pin 86 to the terminal end of the lever 64 and suitable brace rods 88 and 90 respectively diverge from an intermediate portion of rod 84 to bearings 92 and 94 circumposed about the rod 80. As the drive shaft is rotated in the manner indicated by the arcuate direction arrows of Figures 1 and 4, the sleeve elements will be vertically oscillated for urging the whip means 30 into engagement with some of the branches and fruit of a tree being treated, and will accordingly dislodge some of the fruit for the purpose previously mentioned.

The whip means comprises replaceable and removable flexible whips 96 which are identical and will be of a length sufficient to treat a particular type of fruit-bearing tree. The whips each comprise a flexible shaft 98, the lower end of which being telescoped into a socket portion 70 as seen in Figure 5. Circumposed about the upper end of the shaft 98 is a longitudinally extending coil spring 100, the upper end of the spring receiving therein the lower end of a longitudinal connector shaft 102. The upper end of the shaft 102 has telescoped thereon a tubular resilient sleeve 104 of rubber or any other suitable material. The flexible shafts 98, coil springs 100 and resilient sleeves 104 provide sufficient "give" to the whips to obviate injury to the fruit remaining on the trees for proper maturing.

The construction shown embodies the invention in a preferred form, but it is intended that the disclosure be illustrative rather than definitive, the invention being defined in the appended claims.

What is claimed as new is as follows:

1. A power-operated fruit thinner comprising a support frame, power means on said frame, oscillating-movement transmitting means on said frame operatively connected to said power means, and vertically oscillatable whip means on said frame operatively connected to said oscillating-movement transmitting means for dislodging excess fruit from a tree to improve the crop yield.

2. A power-operated fruit thinner as set forth in claim 1, in which said oscillating-movement transmitting means comprises a vertically extending whip-holder member rockably supported on said frame and a pitman-type drive extending between said power means and a lower portion of said whip-holder member.

3. A power-operated fruit thinner as set forth in claim 2, in which said whip-holder member includes at least one upwardly opening socket portion, said whip means comprising an elongated whip shaft received at its lower end in said socket portion, said whip shaft including a resilient element at its upper end and an intermediate longitudinal spring portion.

4. A power-operated fruit thinner as set forth in claim 1 in which is included hitch means for mounting the frame on a "three-point" hitch of a tractor, said power means comprising a drive shaft connected at one end to said oscillating-force transmitting means and including a connector at its other end for connection to the power-take-off of the tractor.

5. A power-operated fruit thinner as set forth in claim 1 in which said frame includes a vertically extending support portion, a rock shaft on said oscillating-movement transmitting means and journaled on said support portion, said power means comprising a drive shaft journaled on said frame and including means at one end for connection to a rotary power source, said oscillating movement transmitting means including a pitman drive shaft connected to the other end of said drive shaft.

6. A power-operated fruit thinner as set forth in claim 5 in which said oscillating-movement transmitting means comprises a plurality of horizontally spaced upwardly opening socket portions, said whip means comprising elongated flexible whips received at their lower ends in said socket portions.

7. A power-operated fruit thinner as set forth in claim 6 in which said whips include a flexible shaft terminating in a resilient terminal end portion and an intermediate longitudinally extending coil spring.

References Cited in the file of this patent

UNITED STATES PATENTS 2,772,514    Mangnall   ------------- Dec. 4, 1956

FOREIGN PATENTS 705,436    France   ---------------- Mar. 9, 1931
29,465    Germany   -------------- Nov. 4, 1884